US011902796B2

(12) United States Patent
Xu (10) Patent No.: US 11,902,796 B2
(45) Date of Patent: Feb. 13, 2024

(54) COMMUNICATION METHOD, TERMINAL DEVICE, AND NETWORK DEVICE (71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 485 days.

(21) Appl. No.: 17/178,197

(22) Filed: Feb. 17, 2021

(65) Prior Publication Data
US 2021/0185543 A1 Jun. 17, 2021

Related U.S. Application Data (63) Continuation of application No. PCT/CN2018/101010, filed on Aug. 17, 2018.

(51) Int. Cl.
*H04W 4/00* (2018.01)
*H04W 16/14* (2009.01)
(Continued)

(52) U.S. Cl.
CPC ........... *H04W 16/14* (2013.01); *H04L 5/0048* (2013.01); *H04W 72/0446* (2013.01); *H04W 72/23* (2023.01)

(58) Field of Classification Search
USPC ........................................ 370/329, 330, 328
See application file for complete search history.

(56) References Cited

U.S. PATENT DOCUMENTS 1,121,274 A  * 12/1914 McElhenie ............. B05C 17/12
                                                  15/210.5
11,064,465 B2 *  7/2021 Li ......................... H04L 5/0037
(Continued)

FOREIGN PATENT DOCUMENTS

CN        103249153 A      8/2013
CN        106507497        3/2017
(Continued)

OTHER PUBLICATIONS

EPO, Extended European Search Report for EP Application No. 18930268.0, dated Jul. 30, 2021.
(Continued)

*Primary Examiner* — Chuong T Ho
(74) *Attorney, Agent, or Firm* — Hodgson Russ LLP (57) ABSTRACT

Embodiments of the present application relate to a communication method, a terminal device, and a network device. The method comprises: a terminal device receives, over an unlicensed frequency spectrum, a first signal transmitted by a network device, wherein the first signal is used for indicating that the network device obtains the channel resource of the unlicensed frequency spectrum; based on the first signal, the terminal device determines the first time-domain resource position of a second signal, wherein the second signal is used for indicating information needed to be obtained by the network device that communicates with the terminal device by using the channel resource of the unlicensed frequency spectrum, or the second signal is a downlink reference signal; and based on the first time-domain resource position, the terminal device receives, over the unlicensed frequency spectrum, the second signal transmitted by the network device.

16 Claims, 4 Drawing Sheets

(51) Int. Cl.
*H04L 5/00* (2006.01)
*H04W 72/0446* (2023.01)
*H04W 72/23* (2023.01)

(56) References Cited

U.S. PATENT DOCUMENTS

| | | | | |
|---|---|---|---|---|
| 2012/0127938 | A1* | 5/2012 | Lv | H04W 72/12 370/329 |
| 2016/0183302 | A1 | 6/2016 | Chen et al. | |
| 2017/0245272 | A1 | 8/2017 | Li et al. | |
| 2018/0139767 | A1 | 5/2018 | Lee et al. | |
| 2018/0324604 | A1* | 11/2018 | Yang | H04W 24/02 |
| 2019/0268939 | A1* | 8/2019 | Yang | H04W 74/0808 |
| 2020/0120655 | A1* | 4/2020 | Ma | H04L 5/0053 |
| 2020/0228286 | A1* | 7/2020 | Yum | H04L 1/1614 |

FOREIGN PATENT DOCUMENTS

| | | |
|---|---|---|
| CN | 107995636 | 5/2018 |
| CN | 108023696 | 5/2018 |
| CN | 108243457 | 7/2018 |
| EP | 3104650 | 12/2016 |
| EP | 3209076 | 8/2017 |
| WO | 2017185011 A1 | 10/2017 |
| WO | 2018076956 | 5/2018 |
| WO | 2018141308 A1 | 8/2018 |
| WO | 2018143346 A1 | 8/2018 |

OTHER PUBLICATIONS

CNIPA, First Office Action for CN Application No. 201880096325.0, dated Nov. 18, 2022.
EPO, Communication for EP Application No. 18930268.0, dated Feb. 1, 2022.
WIPO, ISR and WO for PCT/CN2018/101010, dated Apr. 8, 2019.
CNIPA, Second Office Action for CN Application No. 201880096325.0, dated May 16, 2023.
CNIPA, Decision of Rejection for CN Application No. 201880096325.0, dated Sep. 14, 2023.

\* cited by examiner

COMMUNICATION METHOD, TERMINAL DEVICE, AND NETWORK DEVICE

CROSS-REFERENCE TO RELATED APPLICATION

This application is a continuation of International Application No. PCT/CN2018/101010, filed Aug. 17, 2018, the entire disclosure of which is incorporated herein by reference.

TECHNICAL FIELD

The present application relates to the field of communications, and in particular, to a communication method, a terminal device, and a network device.

BACKGROUND

Data transmission over an unlicensed spectrum is supported in a New Radio (NR) system. When a communication device performs communication over the unlicensed spectrum, it needs to base on a principle of Listen Before Talk (LBT), that is, before the communication device performs signal sending on a channel of the unlicensed spectrum, channel listening (or referred to as channel detection) needs to be performed, and only when a channel listening result indicates that the channel is idle, the communication device can perform signal sending; if the channel listening result of the communication device over the unlicensed spectrum indicates that the channel is busy, the communication device cannot send signals.

However, there is no clear specification on how the terminal device detects the downlink signal after the channel listening result indicates that the channel is idle.

SUMMARY

The embodiments of the present application provide a communication method, a terminal device and a network device, and the terminal device can efficiently detect a downlink signal after the channel listening result indicates that the channel is idle.

In a first aspect, a communication method is provided, including:
  receiving, by a terminal device, a first signal sent by a network device over an unlicensed spectrum, where the first signal is used for indicating that the network device obtains a channel resource of the unlicensed spectrum;
  determining, by the terminal device, a first time-domain resource position of a second signal based on the first signal, where the second signal is used for indicating information needed to be obtained by the network device for implementing communication with the terminal device by using the channel resource of the unlicensed spectrum, or the second signal is a downlink reference signal; and
  receiving, by the terminal device, the second signal sent by the network device over the unlicensed spectrum based on the first time-domain resource position.

In a second aspect, a communication method is provided, including:
  sending, by a network device, a first signal to a terminal device over an unlicensed spectrum, where the first signal is used for indicating that the network device obtains a channel resource of the unlicensed spectrum;
  determining, by the network device, a first time-domain resource position of a second signal based on the first signal, where the second signal is used for indicating information needed to be obtained by the network device for implementing communication with the terminal device by using the channel resource of the unlicensed spectrum, or the second signal is a downlink reference signal; and
  sending, by the network device, the second signal to the terminal device over the unlicensed spectrum based on the first time-domain resource position.

In a third aspect, a terminal device for performing the method in the first aspect or its various implementations is provided.

Specifically, the terminal device includes a functional module for performing the method in the first aspect or various implementations thereof.

In a fourth aspect, a network device for performing the method in the second aspect or its various implementations is provided.

Specifically, the network device includes a functional module for performing the method in the second aspect or various implementations thereof.

In a fifth aspect, a terminal device is provided, including a processor and a memory. The memory is used for storing a computer program, and the processor is used for calling and running the computer program stored in the memory, so as to perform the method in the first aspect or various implementations thereof.

In a sixth aspect, a network device is provided, including a processor and a memory. The memory is used for storing a computer program, and the processor is used for calling and running the computer program stored in the memory, so as to perform the method in the second aspect or various implementations thereof.

In a seventh aspect, a chip for implementing the method of any one of the first to second aspects or various implementations thereof is provided.

Specifically, the chip includes: a processor used for calling from the memory and running the computer program, so as to enable the device on which the chip is mounted to perform the method of any one of the first to second aspects or various implementations thereof.

In an eighth aspect, a computer readable storage medium for storing a computer program is provided, the computer program enabling a computer to perform the method of any one of the first to second aspects or various implementations thereof.

In a ninth aspect, a computer program product is provided including a computer program instruction, the computer program instruction enables a computer to perform the method of any one of the first to second aspects or various implementations thereof.

In a tenth aspect, a computer program is provided, which, when being performed on a computer, enables the computer to perform the method of any one of the first to second aspects or various implementations thereof.

By the above technical solutions, after the network device obtains the channel resource of the unlicensed spectrum, the terminal device may determine the time-domain resource position of the downlink signal based on the indication signal sent by the network device, so that the downlink signal can be efficiently detected.

DETAILED DESCRIPTION

The technical solutions in the embodiments of the present application will be described below in combination with the drawings in the embodiments of the present application. It is apparent that the described embodiments are not all embodiments but part of embodiments of the present application. All other embodiments obtained by those of ordinary skill in the art on the basis of the embodiments in the present application without creative work shall fall within the scope of protection of the present application.

The technical solutions of the embodiments of the present application can be applied to various communication systems, for example: a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, LTE Time Division Duplex (TDD), a Universal Mobile Telecommunication System (UMTS), a Worldwide Interoperability for Microwave Access (WiMAX) communication system, or a 5G system.

Figure 1:
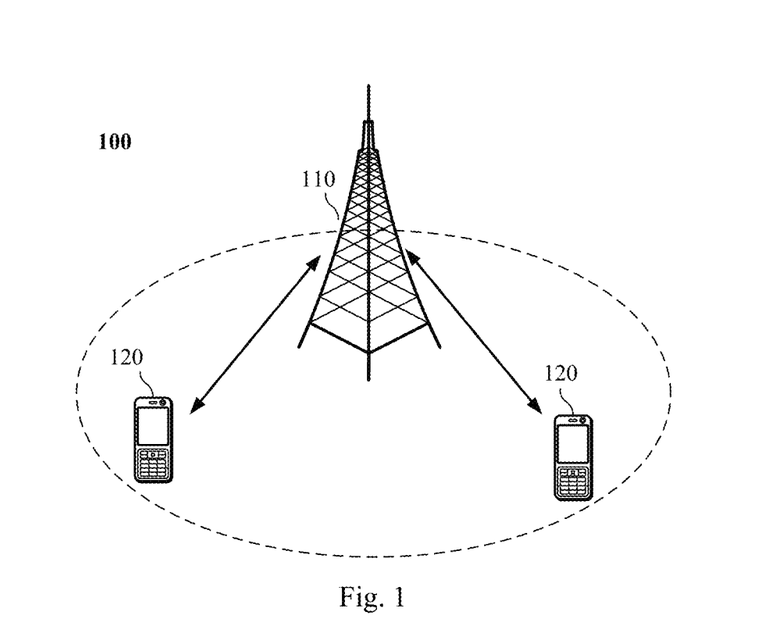
FIG. 1 is a schematic diagram of a communication system architecture provided by an embodiment of the present application.

For example, a communication system 100 applied by the embodiments of the present application is as shown in FIG. 1. The communication system 100 may include a network device 110, and the network device 110 may be a device that communicates with a terminal device 120 (or referred to as a communication terminal, a terminal). The network device 110 may provide communication coverage for a specific geographical area and may communicate with a terminal device located within the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network-side device in a 5G network, or a network device in a future evolved Public Land Mobile Network (PLMN), etc.

The communication system 100 further includes at least one terminal device 120 located within a coverage area of the network device 110. The "terminal device" used herein includes, but is not limited to, connection via wired lines, such as via Public Switched Telephone Networks (PSTN), a Digital Subscriber Line (DSL), a digital cable, a direct cable connection; and/or another data connection/network; and/or via a wireless interface, such as for a cellular network, a Wireless Local Area Network (WLAN), a digital television network such as a DVB-H network, a satellite network, an AM-FM broadcast transmitter; and/or an equipment of another terminal device configured to receive/send communication signals; and/or an Internet of Things (IoT) device. A terminal device configured to communicate through a wireless interface may be referred to as a "wireless communication terminal", a "wireless terminal" or a "mobile terminal". Examples of mobile terminals include, but are not limited to, a satellite or cellular telephone; a Personal Communications System (PCS) terminal that can combine a cellular radiotelephone with data processing, facsimile and data communication capabilities; a PDA that may include a radiotelephone, a pager, an internet/intranet access, a web browser, a notepad, a calendar, and/or a Global Positioning System (GPS) receiver; and a conventional laptop and/or a palm-type receiver or other electronic devices including a radiotelephone transceiver. A terminal device may refer to an access terminal, a User Equipment (UE), a subscriber unit, a subscriber station, a mobile station, a remote platform, a remote terminal, a mobile device, a user terminal, a wireless communication device, a user agent, or a user apparatus. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a 5G network, or a terminal device in a future evolved PLMN, etc.

Optionally, a Device to Device (D2D) communication may be performed between the terminal devices 120.

Optionally, the 5G system or 5G network may also be referred to as a New Radio (NR) system or NR network.

FIG. 1 exemplarily shows one network device and two terminal devices, and optionally, the communication system 100 may include a plurality of network devices, and other numbers of terminal devices may be included within the coverage area of each network device, which are not limited in the embodiment of the present application.

Optionally, the communication system 100 may further include other network entities such as a network controller, a mobility management entity, etc., which is not limited in the embodiment of the present application.

It should be understood that the device having a communication function in the network/system in the embodiment of the present application may be referred to as a communication device. Taking the communication system 100 shown in FIG. 1 as an example, the communication device may include a network device 110 and a terminal device 120 having a communication function, and the network device 110 and the terminal device 120 may be the specific devices described above, and are not described here again for brevity; the communication device may further include other devices in the communication system 100, such as other network entities, for example, a network controller, a mobile management entity, etc., which are not limited in the embodiment of the present application.

An unlicensed spectrum is a spectrum that is divided by countries and regions for communication of the radio equipment and may be considered to be a shared spectrum, that is, communication devices in different communication systems can use this spectrum without applying for a proprietary spectrum license from the government as long as they meet regulatory requirements set by the countries or the regions on the spectrum. In order to allow various communication systems that use the unlicensed spectrum for performing wireless communication to coexist friendly on this spectrum, LBT principle may be followed when a communication device communicates over the unlicensed spectrum. And in order to ensure fairness, in a single transmission, a duration in which the communication device uses the channel of the unlicensed spectrum to perform signal transmission cannot exceed a Maximum Channel Occupation Time (MCOT).

In a system using an unlicensed spectrum, LBT is required for the network device to send a downlink channel, and the time for occupying the channel at one time is limited, so the transmission of the downlink channel and signals may be discontinuous. However, the terminal device does not know when the network device starts to occupy the downlink channel for transmission, and the downlink channel therefore needs to be continuously detected, for example, the PDCCH channel is detected blindly, which may cause power consumption of the terminal device. In order to reduce the power consumption of the terminal device, one solution is that after the channel listening result performed by the network device is idle, the network device sends an indication signal to the terminal device to notify the terminal device to obtain a downlink transmission opportunity. For the terminal device, it is usually only necessary to sense the indication signal, and after knowing that the network device seizes the downlink channel based on the indication signal, the terminal device may start to receive the corresponding downlink channel or signal, such as a PDCCH, a reference signal, etc. Before receiving the indication, the terminal device may not detect channels or signals other than the indication signal. In the following, a way to efficiently detect the downlink channel or signal is provided.

Figure 2:
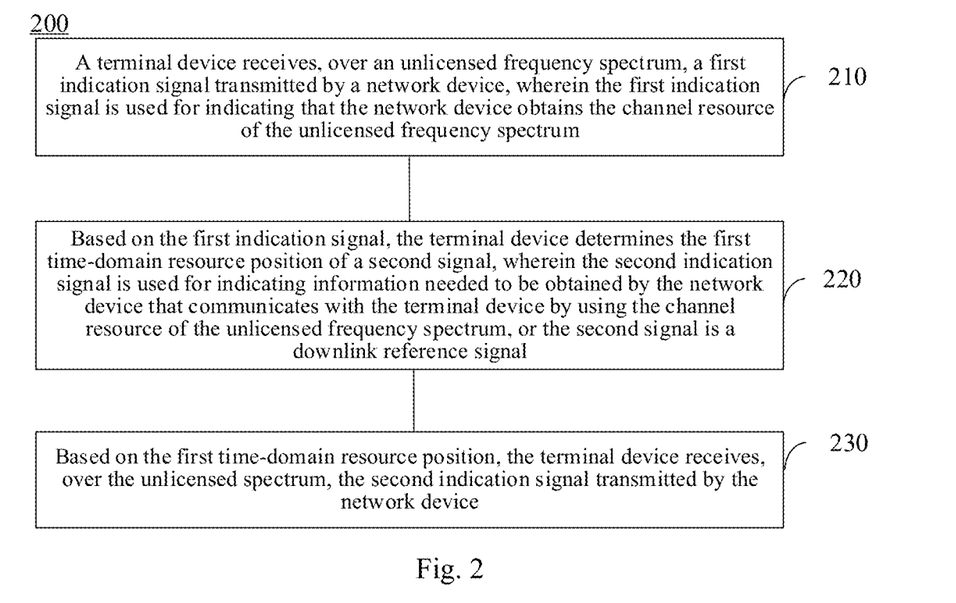
FIG. 2 is a schematic flowchart of a communication method provided by an embodiment of the present application.

FIG. 2 is a schematic flowchart of a communication method 200 according to an embodiment of the present application. The method 200 may be performed by the terminal device and may include at least part of the following.

In 210, the terminal device receives a first signal sent by a network device over an unlicensed spectrum, where the first signal is used for indicating that the network device obtains a channel resource of the unlicensed spectrum.

In 220, the terminal device determines the first time-domain resource position of the second signal based on the first signal.

The second signal is used for indicating information needed to be obtained by the network device for implementing communication with the terminal device by using the obtained channel resource of the unlicensed spectrum, or the second signal is a downlink reference signal.

In 230, the terminal device receives the second indication signal sent by the network device over the unlicensed spectrum based on the first time-domain resource position.

Figure 3:
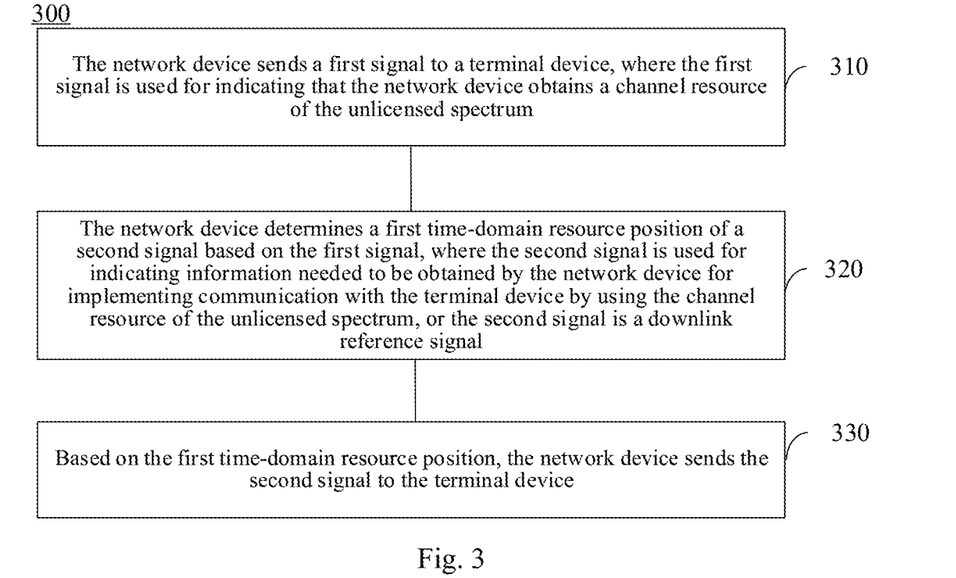
FIG. 3 is a schematic flowchart of a communication method provided by an embodiment of the present application.

FIG. 3 is a schematic flowchart of a communication method 300 according to an embodiment of the present application. The method 300 may be performed by the network device and may include at least part of the following.

In 310, the network device sends the first signal to the terminal device over the unlicensed spectrum, where the first signal is used for indicating that the network device obtains a channel resource of the unlicensed spectrum.

In 320, the network device determines the first time-domain resource position of the second signal based on the first signal.

In 330, the network device sends the second signal to the terminal device over the unlicensed spectrum.

In the following, the communication method according to the embodiment of the present application will be further described with reference to FIGS. 2 and 3. It is to be understood that the following description may be applied to both the method 200 and to the method 300.

When the network device performs downlink transmission over the unlicensed spectrum, channel sensing may be performed at first. When the channel sensing result indicates that the channel is idle, the network device may send the first signal to the terminal device over the unlicensed spectrum to notify the terminal device that the channel is successfully seized, and communication will be performed with the terminal device for a period of time in the future.

It should be understood that in the embodiment of the present application, the first signal may also be referred to as an energy saving signal.

Accordingly, the terminal device may obtain the first signal over the unlicensed spectrum.

Optionally, there are many ways for the terminal device to obtain the first signal, which are not specifically limited by the embodiments of the present application. For example, the terminal device may obtain the first signal in a blind detection way.

After the network device sends the first signal, the network device may determine the first time-domain resource position of the second signal based on the first signal. After determining the first time-domain resource position, the network device may send the second signal to the terminal device over the unlicensed spectrum based on the first time-domain resource position.

Accordingly, after the terminal device receives the first signal, the terminal device may determine the first time-domain resource position based on the first signal. After the terminal device determines the first time-domain resource position, the terminal device may receive the second signal sent by the network device over the unlicensed spectrum based on the first time-domain resource position.

Optionally, the information needed to be obtained by the network device for implementing communication with the terminal device may include, but is not limited to, at least one of a time slot structure, a channel usage duration, a channel usage bandwidth, and attribute information of the network device. The attribute information of the network device may include operator information of the network device, etc., and the embodiments of the application are not specifically limited thereto.

In an embodiment of the present application, the time slot structure may include a time slot structure of at least one time slot, and the time slot structure may be represented as a state of each Orthogonal Frequency Division Multiplexing (OFDM) symbol within each of at least one time slot, such as whether a symbol is an uplink symbol, a downlink symbol, or a guard symbol.

When the second signal indicates time slot structures of a plurality of time slots, the time slot structures of the plurality of time slots may be the same or different.

For example, if the second signal indicates time slot structures of 3 time slots, the time slot structures of the 3 time slots may all be {DDDDDDDDDDDDDDDD}, where D represents a downlink symbol.

For another example, if the second signal indicates time slot structures of 3 time slots, the time slot structure of a first of the 3 time slots may be {DDDDDDDDDDDDDD}, the time slot structure of a second time slot may be {DDUUUUUDXDUUDD}, and the time slot structure of a third time slot may be {DDUUUUUDXDUUDD}, where U represents an uplink symbol and X represents a flexible status symbol, and the network device may configure the flexible status symbol as an uplink symbol or a downlink symbol according to a scheduling situation.

As an example, the time slot structure may be represented by a time slot number. One slot number corresponds to a group of time slot structures.

The numbers (quantities) of the time slots corresponding to different time slot numbers may be the same, but the corresponding time slot structures are different, it can be that one of the time slots has a different time slot structure, or a plurality of time slots may have different time slot structures, respectively.

Optionally, the corresponding relationship between the time slot number and the time slot structure may be preset.

As one possibility, the corresponding relationship between the time slot number and the time slot structure may be preconfigured by the network device.

As one possibility, the corresponding relationship between the time slot number and the time slot structure may be predefined by the protocol, and provided on the terminal device and the network device.

Optionally, the indication of the time slot structure by the second signal may be understood as: the second signal explicitly indicates the time slot structure; or the second signal implicitly indicates the time slot structure.

The explicit indication of the time slot structure by the second signal may include: the second signal directly indicates the time slot structure, for example, indicates the time slot structure of one time slot, and the second signal may carry 14 bits, which indicate whether 14 symbols are uplink symbols, downlink symbols, or guard symbols, respectively.

In one case, the implicit indication of the time slot structure by the second signal may include: the second signal indicates the time slot number corresponding to the time slot structure.

After the terminal device receives the time slot number, the time slot structure may be determined according to a preset corresponding relationship between the time slot number and the time slot structure and the received time slot number.

For example, there are 256 time slot numbers, and each time slot number indicates a time slot structure of four time slots, and the terminal device may know the time slot structure of 4 time slots after receiving the time slot number.

Optionally, the channel usage duration may be represented as a time for occupying the channel after the network device seizes the channel, and it may be counted from the transmission time of the first signal, or counted from the transmission time of the second signal.

Optionally, in the embodiment of the present application, the second signal may be a PDCCH, and may carry an indication bit in the PDCCH, so as to indicate information needed to be obtained by the network device for implementing communication with the terminal device by using the acquired channel resource of the unlicensed spectrum. The embodiments of the application may also have other implementations to achieve this indication function.

As an example, the second signal may indicate information needed to be obtained by the network device for implementing communication with the terminal device by using the acquired channel resource of the unlicensed spectrum based on a sequence of the second signal.

Optionally, the second signal may indicate the time slot structure by a sequence length of the second signal.

Optionally, the sequence length of the second signal may correspond to the time slot structure one by one.

For example, one sequence length of the second signal corresponds to time slot structure 1, and another sequence length of the second signal is 5 and corresponds to time slot structure 2.

Optionally, the second signal may indicate the time slot structure by a sequence type of the second signal.

For example, one sequence type of the second signal may correspond to time slot structure 1, and another sequence type of the second signal may correspond to time slot structure 2.

Optionally, the second signal may indicate the time slot structure by a sequence cyclic offset of the second signal.

For example, one sequence cyclic offset of the second signal may correspond to time slot structure 1, and another sequence cyclic offset of the second signal may correspond to time slot structure 2.

As an example, the second signal may indicate information needed to be obtained by the network device for implementing communication with the terminal device by using the acquired channel resource of the unlicensed spectrum based on a resource position of the second signal.

For example, the second signal indicates slot structure 1 when the second signal is in resource position 1, and indicates slot structure 2 when the second signal is in resource position 2.

Optionally, information needed to be obtained by the network device for implementing communication with the terminal device by using the acquired channel resource of the unlicensed spectrum may be indicated based on the position difference between the resource position of the first signal and the resource position of the second signal.

For example, a position difference of H symbols between the resource position of the first signal and the resource position of the second signal may correspond to time slot structure 1, and a position difference of T symbols between the resource position of the first signal and the resource position of the second signal may correspond to time slot structure 2. H and T are positive integers larger than or equal to 1. Optionally, the second signal may be a downlink channel or a downlink reference signal.

Optionally, the downlink channel may include a Physical Downlink Control Channel (PDCCH), an Enhanced Physical Downlink Control Channel (EPDCCH), a Machine Type Communication Physical Downlink Control Channel (MPDCCH) or a Narrowband Physical Downlink Control Channel (NPDCCH), etc.

Optionally, the downlink reference signal may include a downlink Synchronization Signal, a Phase Tracking Reference Signal (PT-RS), a downlink DeModulation Reference Signal (DMRS), a Channel State Information-Reference Signal (CSI-RS), a Synchronization Signal block (SSB), etc. The downlink Synchronization Signal may be used for network accessing and radio resource management measurement, the downlink DMRS may be used for demodulation of a downlink channel, the CSI-RS may be used for downlink channel measurement, downlink time-frequency synchronization or phase tracking, and the PT-RS may also be used for downlink channel measurement, downlink time-frequency synchronization or phase tracking.

Optionally, the first time-domain resource position may include a specific time-domain resource position of the second signal, and may further include a position of a time-domain resource set where the second signal is located.

When the second signal is a PDCCH, the time-domain resource set where the second signal is located is a PDCCH Control-Resource Set (CORESET), and the first time-domain resource position may be a position of the PDCCH CORESET.

Optionally, the PDCCH CORESET may be preconfigured by the network device, or may be predefined by the protocol.

It should be noted that, if the first time-domain resource position is the position of the time-domain resource set where the second signal is located, after determining the position of the time-domain resource set, the terminal device may perform blind detection on the resource set where the second signal is located to obtain the second signal, and the embodiments of the application are not limited thereto.

For example, when the second signal is a PDCCH and the first time-domain resource position is a position of a PDCCH CORESET, the terminal device may determine the position of the PDCCH from the PDCCH CORESET in a blind detection manner.

When the first time-domain resource position may include a specific time-domain resource position of the second signal, the terminal device may directly obtain the second signal at this position without performing blind detection, and at this time, the second signal may be a downlink reference signal.

Optionally, the first time-domain resource position may include a time slot where the second signal is located and/or a symbol in the time slot.

It should be understood that the time slot where the second signal is located may include one time slot or a plurality of time slots, and the second signal may occupy a part of the time slots, or may occupy a part of the symbols in all time slots.

The symbol in the time slot where the second signal is located may be a symbol set, and the second signal may be carried on a part of symbols on the symbol set (at this time, blind detection needs to be performed on the second signal), or may be carried on all symbols on the symbol set (at this time, blind detection may not be performed on the second signal, and the second signal is directly obtained on the symbol set).

It should be understood that term "and/or" herein is only an association relationship describing associated objects and represents that three relationships may exist, for example, A and/or B may represent three situations, i.e., A exists alone, both A and B exist, and B exists alone.

Optionally, the first time-domain resource position occupies at least one symbol in the time-domain.

When the first time-domain resource position occupies a plurality of symbols in the time-domain, optionally, the plurality of symbols is consecutive. At this time, the plurality of symbols may be on one time slot.

For example, the first time-domain resource position occupies 8 symbols in the time-domain, and all the 8 symbols may be on the same time slot.

When the first time-domain resource position occupies a plurality of symbols in the time-domain, optionally, the plurality of symbols may be on a plurality of time slots, and at this time, the plurality of symbols may be consecutive or inconsecutive in time.

For example, the first time-domain resource position occupies 8 symbols in the time-domain, 5 symbols of the 8 symbols are on time slot 1, and 3 symbols are on time slot 2.

Optionally, the first time-domain resource position has a predetermined time difference with the second time-domain resource position occupied by the first signal, e.g., by a predetermined number of time slots and/or symbols.

The predetermined number of time slots and/or symbols differs between the first time-domain resource position and the second time-domain resource position may be preset.

As one possibility, the predetermined number of time slots and/or symbols may be preconfigured by the network device. The network device may send first indication information to the terminal device, where the first indication information is used to indicate a time slot and/or a symbol that is differed between the first time-domain resource position and the second time-domain resource position. After receiving the first indication information, the terminal device may obtain the time slot and/or the symbol that is differed between the first time-domain resource position and the second time-domain resource position.

For example, the first indication information may or may not be included in the first signal. When the first indication information is not included in the first signal, the embodiment of the present application does not limit the order of sending the first signal and the first indication information by the network device. For example, the network device may send the first signal first and then send the first indication information; or the network device may send the first indication information first and then send the first signal.

As another possibility, the predetermined number of time slots and/or symbols may be predefined by the protocol, and provided on the terminal device and the network device.

Optionally, in an embodiment of the present application, if the first signal and the second signal are inconsecutive in the time-domain, the network device may send a placeholder signal in a time interval between the first signal and the second signal, so as to occupy the channel of the unlicensed spectrum in a time period between the first signal and the second signal.

In one implementation, the determining, by the terminal device, the first time-domain resource position of the second signal based on the first signal may include: determining, by the terminal device, the first time-domain resource position based on the second time-domain resource position occupied by the first signal.

In the implementation, as one possible embodiment, the terminal device may determine the first time-domain resource position based on the time slot position where the first signal is located. At this time, there are two implementation manners.

In the first manner, the time slot where the second signal is located may be the first time slot, and at this time, the first time slot may be the time slot where the first signal is located. That is, the first signal and the second signal are located in the same time slot.

Optionally, the first time slot may be one time slot or a plurality of time slots, and the embodiments of the present application are not specifically limited thereto.

As an example, the plurality of consecutive symbols included in the first time-domain resource position may be consecutive symbols of the preset positions in the first time slot.

Optionally, the preset positions may be predefined by the protocol.

Optionally, the preset positions may be last multiple consecutive positions in the first time slot.

Figure 4:
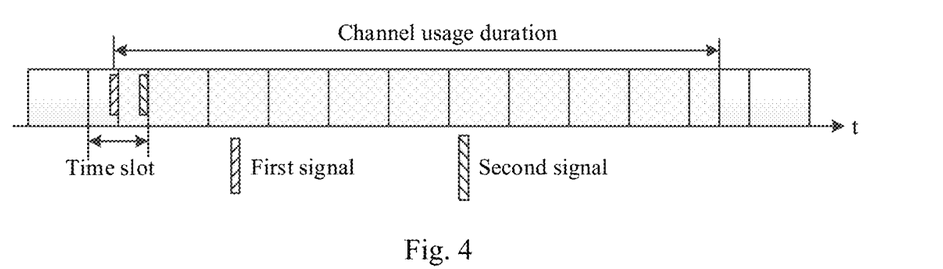
FIG. 4 is a schematic diagram for determining a first time-domain resource position provided by an embodiment of the present application.

For example, it is assumed that the first time-domain resource position includes M consecutive symbols, where M is an integer larger than or equal to 1. As shown in FIG. 4, the preset position may be the last M symbols of the time slot where the first signal is located.

Figure 5:
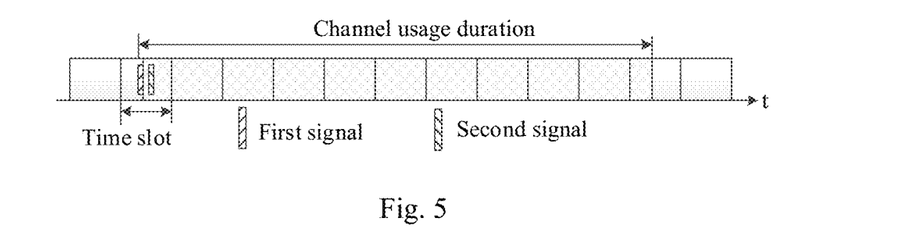
FIG. 5 is another schematic diagram for determining the first time-domain resource position provided by an embodiment of the present application.

Alternatively, as shown in FIG. 5, the preset position may be M consecutive symbols starting from the 8th OFDM symbol of the time slot where the first signal is located, where the number of the OFDM symbols starts from 1.

As another example, the network device may send second indication information to the terminal device, and the second indication information is used to indicate that the plurality of consecutive symbols included in the first time-domain resource position are the plurality of consecutive symbols in the first time slot.

For example, the second indication information may indicate that the plurality of consecutive symbols included in the first time-domain resource position are last multiple consecutive symbols in the time slot where the first signal is located.

Optionally, the first signal may include the second indication information.

Optionally, the first signal may not include the second indication information.

At this time, the sequence of receiving the first signal and the second indication information by the terminal device is not limited in the embodiment of the present application. It should be understood that the context between the first signal and the second indication information in the embodiment of the present application only represents a logical context, and other signals may also be received between the terminal device receiving the first signal and the second indication information.

In the second manner, the time slot where the second signal is located may be the second time slot, and at this time, and the second time slot may differ from the time slot where the first signal is located by at least one time slot.

Optionally, the second time slot may be one time slot or a plurality of time slots, and the embodiments of the present application are not specifically limited thereto.

As an example, the consecutive symbols included in the first time-domain resource position may be consecutive symbols of a preset position in the second time slot.

Optionally, the preset position may be predefined by the protocol.

Optionally, the preset position may be first multiple consecutive positions in the second time slot.

Figure 6:
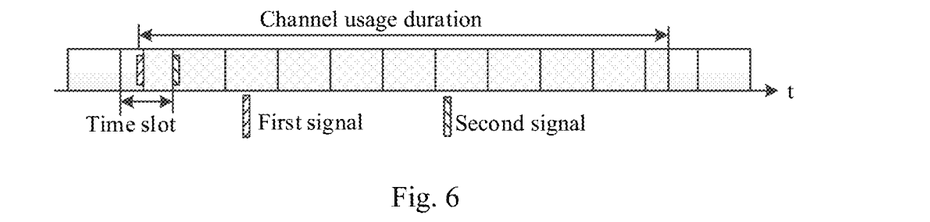
FIG. 6 is another schematic diagram for determining the first time-domain resource position provided by an embodiment of the present application.

For example, it is assumed that the first time-domain resource position includes N consecutive symbols, where the second signal is located in the time slot next to the time slot where the first signal is located, and N is an integer larger than or equal to 1. As shown in FIG. 6, the preset position may be the first N symbols of the next time slot of the time slot where the first signal is located.

Figure 7:
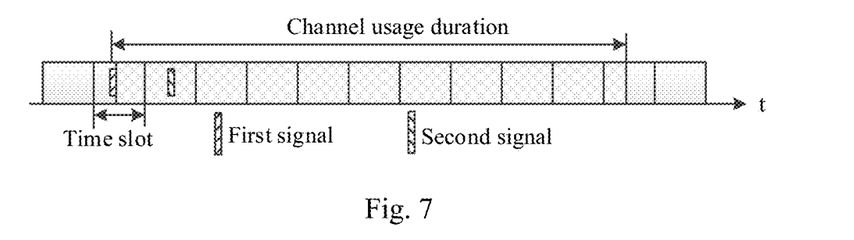
FIG. 7 is another schematic diagram for determining the first time-domain resource position provided by an embodiment of the present application.

Alternatively, as shown in FIG. 7, the preset position may be N consecutive symbols starting from the 8th symbol of the next time slot of the time slot where the first signal is located, where the number of the symbols starts from 1.

As another example, the network device may send third indication information to the terminal device, and the third indication information may indicate that the plurality of consecutive symbols included in the first time-domain resource position are the plurality of consecutive symbols in the first time slot.

For example, the third indication information may indicate that the plurality of consecutive symbols included in the first time-domain resource position are first multiple consecutive symbols in the next time slot of the time slot where the first signal is located.

Optionally, the first signal may include the third indication information.

Optionally, the first signal may not include the third indication information.

As another possible embodiment, the terminal device may determine the time slot where the second signal is located based on the symbol position occupied by the first signal in the time slot where the first signal is located.

As an example, the terminal device may determine a remaining symbol in the time slot where the first signal is located based on the symbol position, and then the terminal device may determine the time slot where the second signal is located based on the remaining symbol.

In one case, if the number of the remaining symbols is larger than or equal to a first threshold, the terminal device may determine that the time slot where the second signal is located is the time slot where the first signal is located, that is, the first signal and the second signal are located in the same time slot.

In another case, if the number of the remaining symbols is smaller than a second threshold, the terminal device may determine that the time slot where the second signal is located is the time slot next to the time slot where the first signal is located.

Optionally, the first and the second thresholds may be the same.

Referring to FIGS. 4 and 6 again, when the network device seizes the channel and obtains the channel resource of the unlicensed spectrum, if relatively more symbols remain in the time slot where the first signal is located, for example, the number of the remaining symbols is larger than M symbols in FIG. 4, the terminal device may determine that the second signal and the first signal are in the same time slot according to the solution in FIG. 4. If the number of the remaining symbols is less than M symbols in FIG. 4, the terminal device may determine that the time slot where the second signal is located is the next time slot to the time slot where the first signal is located according to the solution in FIG. 6.

As another example, if the number of the remaining symbols is smaller than the second threshold, the terminal device may determine that a time slot where a part of the plurality of symbols of the second signal are located is a time slot where the first signal is located, and a time slot where another part of symbols are located is a time slot next to the time slot where the first symbol is located.

For example, if there are 3 symbols remaining in the time slot where the first signal is located and the second signal occupies 5 symbols in the time-domain, the terminal device may determine that the time slot where 3 symbols of the 5 symbols occupied by the second signal in the time-domain are located is the time slot where the first signal is located, and that the time slot where 2 remaining symbols of the 5 symbols occupied by the second signal in the time-domain are located is the next time slot of the time slot where the first signal is located.

3 symbols of the 5 symbols may be the first 3 symbols of the 5 symbols, or may be any 3 symbols of the 5 symbols, which are not limited in the embodiments of the present application.

As another possible embodiment, the terminal device may determine the first time-domain resource position based on the time slot and/or the symbol that is differed between the first time-domain resource position and the second time-domain resource position, and the second time-domain resource position.

The above describes that the first time-domain resource position of the second signal may be determined based on the second time-domain resource position of the first signal. However, the embodiments of the present application are not limited thereto. The present application may also use other ways to determine the first time-domain resource position of the second signal.

For example, the terminal device determines the first time-domain resource position of the second signal based on a sequence of the first signal.

In one implementation, the terminal device may determine the first time-domain resource position based on a sequence length of the first signal.

For example, if the time slot of the first signal is fixed, the specific symbol position of the second signal in the time slot may be determined based on the sequence length of the first signal. In this case, there may be sequences with various lengths, each of which may correspond to different symbol positions for the second signal.

In another implementation, the terminal device determines the first time-domain resource position based on the sequence of the first signal and the second time-domain resource position occupied by the first signal.

For example, if there are sequences with various lengths, each of which may correspond to one time-domain resource size, the time-domain resource size of the second signal may be determined according to the sequence length of the first signal, and the starting position of the time-domain resource may be determined in combination with the time-domain resource position of the first signal, so that the first time-domain resource position may be determined based on the starting position and the resource size.

For example, the time slot occupied by the second signal may be determined based on the time-domain resource position of the first signal, and the specific symbol position of the second signal in the time slot may be determined based on the sequence length of the first signal. In this case, there may be sequences with various lengths, each of which may correspond to different symbol positions for the second signal.

In another implementation, the terminal device may determine the first time-domain resource position based on a sequence type of the first signal.

For example, the first signal may have various sequence types, and different sequence types may correspond to different time-domain resource positions for the second signal, so that the terminal device may determine the first time-domain resource position based on the sequence type of the first signal.

Optionally, the terminal device may also determine the first time-domain resource position based on a sequence cyclic offset of the first signal.

For example, if the sequence cyclic offset of the first signal is different, the first time-domain resource position is different, so that the terminal device can determine the first time-domain resource position based on the sequence cyclic offset of the first signal.

It should be understood that the above describes the specific implementation that the terminal device determines the first time-domain resource position based on the first signal, the implementation that the network device determines the first time-domain resource position based on the first signal may refer to the description that the terminal device determines the first time-domain resource position. For the sake of brevity, the description will not be repeated here.

Optionally, in the embodiment of the present application, a starting time slot suitable for the information needed to be obtained by the network device for implementing communication with the terminal device may be the time slot of the second signal; or the starting time slot suitable for the information needed to be obtained by the network device for implementing communication with the terminal device may be the next time slot of the time slot of the second signal.

For example, when the second signal indicates the time slot structure, the time slot structure may be validated immediately in the time slot where the second signal is located, or may be validated at the time slot next to the time slot where the second signal is located.

Optionally, in the embodiment of the present application, when the second signal indicates a time slot structure of at least one time slot, if the number of time slots of the channel resource of the unlicensed spectrum obtained by the network device is larger than the number of time slots of the time slot structure indicated by the second signal, the network device or the terminal device may periodically and cyclically use the time slot structure indicated by the second signal until the time slot structure indicated by the second signal is applied to all time slots of the channel resource of the unlicensed spectrum.

For example, if the second signal indicates the time slot structures of 3 time slots and there are 6 time slots of the channel resource of the unlicensed spectrum, the terminal device or the network device may cyclically apply the time slot structures of 3 time slots indicated by the second signal on the time slot of the channel resource of the unlicensed spectrum for 2 times.

For another example, if the second signal indicates the time slot structures of 3 time slots and there are 8 time slots of the channel resource of the unlicensed spectrum, the terminal device or the network device may cyclically use the time slot structures of 3 time slots indicated by the second signal on the time slot of the channel resource of the unlicensed spectrum for 2 times, and then apply the first two time slot structures in the time slot structures of 3 time slots indicated by the second signal to the remaining 2 time slots in the channel resource of the unlicensed spectrum.

It should be understood that, in the embodiment of the present application, besides that the network device or the terminal device may periodically and cyclically apply the time slot structure indicated by the second signal to all the time slots of the channel resource of the unlicensed spectrum, the network device or the terminal device may also apply the time slot structure indicated by the second signal to all the time slots of the channel resource of the unlicensed spectrum in other ways.

Optionally, if the number of time slots of the channel resource of the unlicensed spectrum is not an integer multiple of the number of time slots of the time slot structure indicated by the second signal, the network device or the terminal device may cyclically apply the time slot structure indicated by the second signal to the time slot of the channel resource of the unlicensed spectrum for an integer number of times, and the remaining time slots in the channel resource of the unlicensed spectrum may apply one of the time slot structures indicated by the second signal.

For example, if the second signal indicates the time slot structures of 3 time slots and there are 8 time slots of the channel resource of the unlicensed spectrum, the network device or the terminal device may cyclically use the time slot structures of 3 time slots indicated by the second signal for 2 times on the time slot of the channel resource of the licensed spectrum, and one of the 3 time slot structures indicated by the second signal may be applied to the remaining 2 time slots of the channel resource of the unlicensed spectrum.

It should be understood that the specific examples in the embodiments of the present application are merely to help those skilled in the art better understand the embodiments of the present application, and are not intended to limit a scope of the embodiments of the present application.

Optionally, in the embodiment of the present application, if the second signal indicates the time slot structure, the subcarrier interval of the time slot structure may be a subcarrier interval of a currently serving carrier or a serving bandwidth part; or the subcarrier interval of the time slot structure may be a preset subcarrier interval.

Optionally, the subcarrier interval of the time slot structure may be preset by the network device.

Optionally, the subcarrier interval of the time slot structure may be pre-agreed by the terminal device and the network device.

After determining the first time-domain resource position, the network device may send the second signal to the terminal device based on the first time-domain resource position.

Accordingly, after determining the first time-domain resource position, the terminal device may receive the second signal sent by the network device based on the first time-domain resource position.

It should be understood that, in the embodiments of the present application, "first", "second" and "third", etc. are only for distinguishing different objects, and do not limit the scope of the embodiments of the present application.

It should be noted that, in the case of no collision, the embodiments and/or technical features in each of the embodiments described in the present application may be combined with each other arbitrarily, and the resulting technical solutions after the combination shall also fall within the scope of the present application.

According to the embodiment of the present application, after the network device obtains the channel resource of the unlicensed spectrum, the terminal device may determine the time-domain resource position of the downlink signal based on the indication signal sent by the network device, so that the downlink signal can be efficiently detected.

It should be understood that in various embodiments of the present application, a size of a sequence number of each process does not mean an execution sequence and the execution sequence of each process should be determined by its function and an internal logic and should not constitute any limitation to an implementation process of the embodiment of the present application.

The communication method according to the embodiment of the present application is described in detail above, a communication device according to the embodiment of the present application will be described hereinafter with reference to FIGS. 8 to 10, and the technical features described in the method embodiment are applicable to the following device embodiments.

Figure 8:
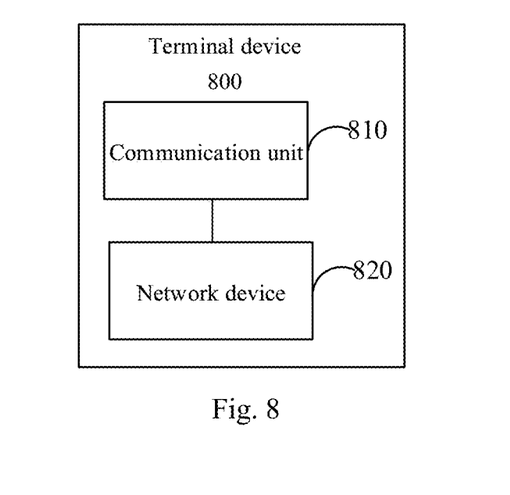
FIG. 8 is a schematic block diagram of a terminal device provided by an embodiment of the present application.

FIG. 8 shows a schematic block diagram of a terminal device 800 according to an embodiment of the present application. As shown in FIG. 8, the terminal device 800 includes:

a communication unit 810, used for receiving a first signal sent by a network device over an unlicensed spectrum, where the first signal is used for indicating that the network device obtains a channel resource of the unlicensed spectrum; and a processing unit 820, used for determining a first time-domain resource position of a second signal based on the first signal, where the second signal is used for indicating information needed to be obtained by the network device for implementing communication with the terminal device 800 by using the channel resource of the unlicensed spectrum, or the second signal is a downlink reference signal.

The communication unit 810 is also used for receiving the second signal sent by the network device over the unlicensed spectrum based on the first time-domain resource position determined by the processing unit 820.

Optionally, in the embodiment of the present application, the information needed to be obtained includes at least one of a time slot structure, a channel usage duration, a channel usage bandwidth, and attribute information of the network device.

Optionally, in the embodiment of the present application, the processing unit 820 is specifically used for: determining the first time-domain resource position based on a second time-domain resource position occupied by the first signal.

Optionally, in the embodiment of the present application, the first time-domain resource position includes a position of a time-domain resource set where the second signal is located.

Optionally, in the embodiment of the present application, the second signal is a PDCCH, and the first time-domain resource position is a position of a PDCCH CORESET.

Optionally, in the embodiment of the present application, the first time-domain resource position occupies a plurality of consecutive symbols in the time-domain.

Optionally, in the embodiment of the present application, the first time-domain resource position differs from a second time-domain resource position occupied by the first signal by a predetermined number of time slots and/or symbols.

Optionally, in the embodiment of the present application, the first time-domain resource position includes a time slot where the second signal is located and/or a symbol in the time slot.

Optionally, in the embodiment of the present application, the time slot where the second signal is located is the first time slot, and the first time slot is a time slot where the first signal is located.

Optionally, in the embodiment of the present application, the first time-domain resource position includes a plurality of consecutive symbols and the plurality of consecutive symbols are a plurality of consecutive symbols in a preset position in the first time slot.

Optionally, in the embodiment of the present application, the first time-domain resource position includes a plurality of consecutive symbols, and the plurality of consecutive symbols are last multiple consecutive symbols in the first time slot.

Optionally, in the embodiment of the present application, the time slot where the second signal is located is a second time slot, and the second time slot differs from a time slot where the first signal is located by at least one time slot.

Optionally, in the embodiment of the present application, the second time slot is located next to the time slot where the first signal is located.

Optionally, in the embodiment of the present application, the first time-domain resource position includes a plurality of consecutive symbols, and the plurality of consecutive symbols are a plurality of consecutive symbols in a preset position in the second time slot.

Optionally, in the embodiment of the present application, the first time-domain resource position includes a plurality of consecutive symbols, and the plurality of consecutive symbols are first multiple consecutive symbols in the second time slot.

Optionally, in the embodiment of the present application, the processing unit 820 is specifically used for: determining a time slot where the second signal is located based on a symbol position occupied by the first signal in the time slot where the first signal is located.

Optionally, in the embodiment of the present application, the processing unit 820 is specifically used for: determining a remaining symbol in the time slot where the first signal is located based on the symbol position; and determining the time slot where the second signal is located based on the remaining symbol.

Optionally, in the embodiment of the present application, when the number of the remaining symbol is larger than or equal to a first threshold, the time slot where the second signal is located is the time slot where the first signal is located.

Optionally, in the embodiment of the present application, when the number of the remaining symbol is less than or equal to the second threshold, the time slot where the second signal is located is a time slot next to the time slot where the first signal is located.

Optionally, in the embodiment of the present application, a starting time slot suitable for the information needed to be obtained is a time slot of the second signal; or
    the starting time slot suitable for the information needed to be obtained is the next time slot of the time slot of the second signal.

It should be understood that the terminal device 800 may correspond to the terminal device in the method 200, and may implement corresponding operations of the terminal device in the method 200, which are not described here again for brevity.

Figure 9:
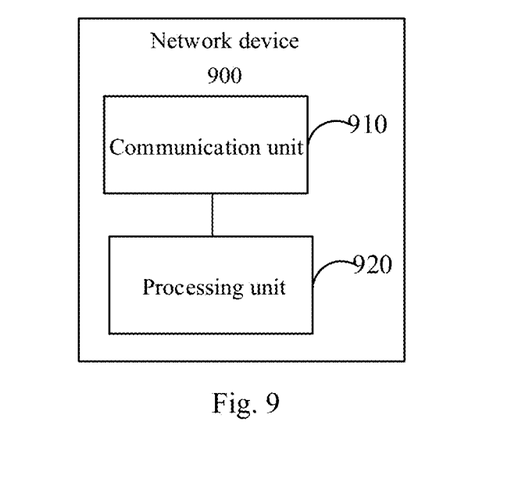
FIG. 9 is a schematic block diagram of a network device provided by an embodiment of the present application.

FIG. 9 shows a schematic block diagram of a network device 900 according to an embodiment of the present application. As shown in FIG. 9, the network device 900 includes:
    a communication unit 910, used for sending a first signal to a terminal device over an unlicensed spectrum, where the first signal is used for indicating that the network device 900 obtains a channel resource of the unlicensed spectrum;
    a processing unit 920, used for determining a first time-domain resource position of a second signal based on a first signal, where the second signal is used for indicating information needed to be obtained by the network device 900 for implementing communication with the terminal device by using the channel resource of the unlicensed spectrum, or the second signal is a downlink reference signal;
    where the communication unit 910 is also used for sending the second signal to the terminal device over the unlicensed spectrum based on the first time-domain resource position.

Optionally, in the embodiment of the present application, the information needed to be obtained includes at least one of a time slot structure, a channel usage duration, a channel usage bandwidth, and attribute information of the network device 900.

Optionally, in the embodiment of the present application, the processing unit 920 is specifically used for: determining the first time-domain resource position based on a second time-domain resource position occupied by the first signal.

Optionally, in the embodiment of the present application, the first time-domain resource position includes a position of a time-domain resource set where the second signal is located.

Optionally, in the embodiment of the present application, the second signal is a PDCCH, and the first time-domain resource position is a position of a PDCCH CORESET.

Optionally, in the embodiment of the present application, the first time-domain resource position occupies a plurality of consecutive symbols in the time-domain.

Optionally, in the embodiment of the present application, the first time-domain resource position differs from a second time-domain resource position occupied by the first signal by a predetermined number of time slots and/or symbols.

Optionally, in the embodiment of the present application, the first time-domain resource position includes a time slot where the second signal is located and/or a symbol in the time slot.

Optionally, in the embodiment of the present application, the time slot where the second signal is located is the first time slot, and the first time slot is a time slot where the first signal is located.

Optionally, in the embodiment of the present application, the first time-domain resource position includes a plurality of consecutive symbols and the plurality of consecutive symbols are a plurality of consecutive symbols in a preset position in the first time slot.

Optionally, in the embodiment of the present application, the first time-domain resource position includes a plurality of consecutive symbols, and the plurality of consecutive symbols are last multiple consecutive symbols in the first time slot.

Optionally, in the embodiment of the present application, the time slot where the second signal is located is a second time slot, and the second time slot differs from a time slot where the first signal is located by at least one time slot.

Optionally, in the embodiment of the present application, the second time slot is located next to the time slot where the first signal is located.

Optionally, in the embodiment of the present application, the first time-domain resource position includes a plurality of consecutive symbols, and the plurality of consecutive symbols are a plurality of consecutive symbols in a preset position in the second time slot.

Optionally, in the embodiment of the present application, the first time-domain resource position includes a plurality of consecutive symbols, and the plurality of consecutive symbols are first multiple consecutive symbols in the second time slot.

Optionally, in the embodiment of the present application, the processing unit 920 is specifically used for: determining a time slot where the second signal is located based on a symbol position occupied by the first signal in the time slot where the first signal is located.

Optionally, in the embodiment of the present application, the processing unit 920 is specifically used for: determining a remaining symbol in the time slot where the first signal is located based on the symbol position; determining the time slot where the second signal is located based on the remaining symbol.

Optionally, in the embodiment of the present application, when the number of the remaining symbol is larger than or equal to a first threshold, the time slot where the second signal is located is the time slot where the first signal is located.

Optionally, in the embodiment of the present application, when the number of the remaining symbol is less than or equal to a second threshold, the time slot where the second signal is located is a time slot next to the time slot where the first signal is located.

Optionally, in the embodiment of the present application, a starting time slot suitable for the information needed to be obtained is a time slot of the second signal; or the starting time slot suitable for the information needed to be obtained is the next time slot of the time slot of the second signal.

It should be understood that the terminal device 900 may correspond to the terminal device in the method 300, and may implement corresponding operations of the terminal device in the method 300, which are not described here again for brevity.

Figure 10:
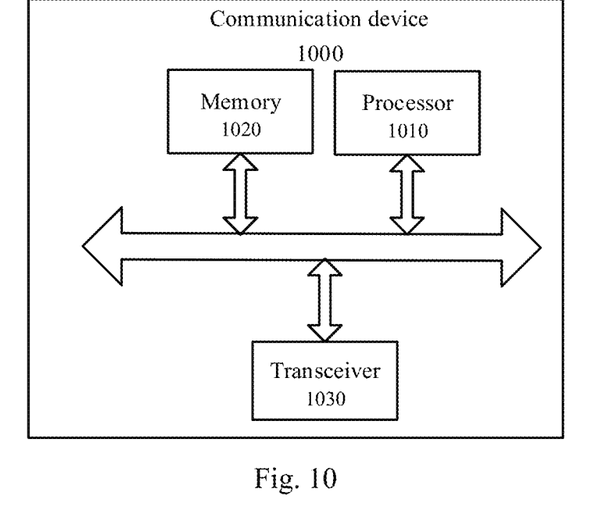
FIG. 10 is a schematic block diagram of a communication device provided by an embodiment of the present application.

FIG. 10 is a schematic structural diagram of a communication device 1000 according to an embodiment of the present application. The communication device 1000 shown in FIG. 10 includes a processor 1010, and the processor 1010 may call a computer program from a memory and run the computer program, in order to implement the method in the embodiments of the present application.

Optionally, as shown in FIG. 10, the communication device 1000 may further include a memory 1020. The processor 1010 may call the computer program from the memory 1020 and run the computer program, in order to implement the method in the embodiments of the application.

The memory 1020 may be a separate device independent of the processor 1010, or may be integrated in the processor 1010.

Optionally, as shown in FIG. 10, the communication device 1000 may further include a transceiver 1030, and the processor 1010 may control the transceiver 1030 to communicate with other devices, and specifically, may send information or data to other devices, or receive information or data sent by other devices.

The transceiver 1030 may include a transmitter and a receiver. The transceiver 1030 may further include an antenna, and the number of antenna may be one or more.

Optionally, the communication device 1000 may specifically be the network device in the embodiments of the present application, and the communication device 1000 may implement the corresponding process implemented by the network device in each method in the embodiments of the present application, which is not described here again for brevity.

Optionally, the communication device 1000 may specifically be the terminal device in the embodiments of the present application, and the communication device 1000 may implement the corresponding process implemented by the terminal device in each method in the embodiments of the present application, which is not described here again for brevity.

Figure 11:
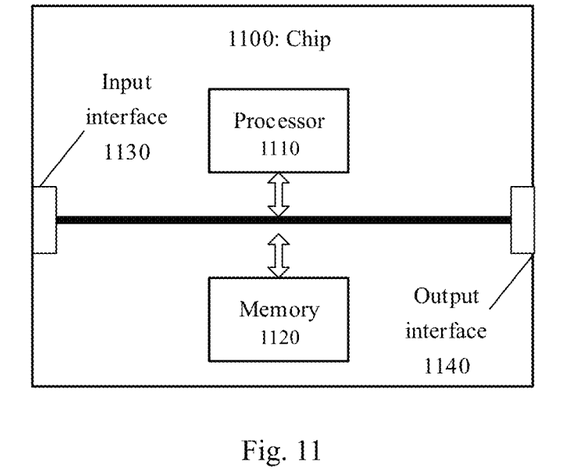
FIG. 11 is a schematic block diagram of a chip provided by an embodiment of the present application.

FIG. 11 is a schematic structural diagram of a chip in an embodiment of the present application. The chip 1100 shown in FIG. 11 includes a processor 1110, and the processor 1110 may call a computer program from a memory and run the computer program in the memory, in order to implement the method in the embodiments of the present application.

Optionally, as shown in FIG. 11, the chip 1100 may further include a memory 1120. The processor 1110 may call the computer program from the memory 1120 and run the computer program in the memory, in order to implement the method in the embodiments of the present application.

The memory 1120 may be a separate device independent of the processor 1110, or may be integrated in the processor 1110.

Optionally, the chip 1100 may further include an input interface 1130. The processor 1110 may control the input interface 1130 to communicate with other devices or chips, and specifically, may obtain information or data sent by the other devices or chips.

Optionally, the chip 1100 may further include an output interface 1140. The processor 1110 may control the output interface 1140 to communicate with other devices or chips, and specifically, may output information or data to the other devices or chips.

Optionally, the chip may be applied to the terminal device in the embodiments of the present application, and the chip may implement the corresponding process implemented by the terminal device in each method in the embodiments of the present application, which is not described here again for brevity.

Optionally, the chip may be applied to the network device in the embodiments of the present application, and the chip may implement the corresponding process implemented by the network device in each method in the embodiments of the present application, which is not described here again for brevity.

It should be understood that the chip mentioned in the embodiments of the present application may also be referred to as a system level chip, a system chip, or a system-on-chip.

It should be understood that the processor in the embodiments of the present application may be an integrated circuit chip with a signal processing capability. In the implementation process, the steps of the method embodiments described above may be accomplished by integrated logic circuits of hardware in a processor or by instructions in the form of software. The processor described above may be a general purpose processor, a Digital Signal Processor (DSP), an Application Specific Integrated Circuit (ASIC), a Field Programmable Gate Array (FPGA) or another programmable logic device, a discrete gate or transistor logic device, and a discrete hardware component. The various methods, steps, and logic blocks disclosed in the embodiments of the present application may be implemented or performed. The general purpose processor may be a microprocessor or the processor may be any conventional processor, etc. The steps of the method disclosed in connection with the embodiments of the present application may be directly embodied by the execution of the hardware decoding processor, or by the execution of a combination of hardware and software modules in the decoding processor. The software module may be located in a storage medium well known in the art such as a random memory, a flash memory, a Read-Only Memory, a Programmable ROM, or an Electrically Erasable PROM and a register, etc. The storage medium is located in a memory, and the processor reads information in the memory, and accomplishes the steps of the method described above in combination with the hardware.

It will be appreciated that the memory in the embodiments of the present application may be a volatile memory or a non-volatile memory, or may include a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which serves as an external high-speed cache. By way of example but not limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SDRAM), and a Direct Rambus RAM (DR RAM). It should be noted that the memory of the system and method described herein is intended to include, but not limited to, these and any other suitable types of memories.

It should be understood that the memory described above is an example but is not intended for limitation, and for example, the memory in the embodiments of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SDRAM), and a Direct Rambus RAM (DR RAM), etc. That is, the memory in the embodiments of the present application is intended to include, but is not limited to, these and any other suitable types of memories.

Figure 12:
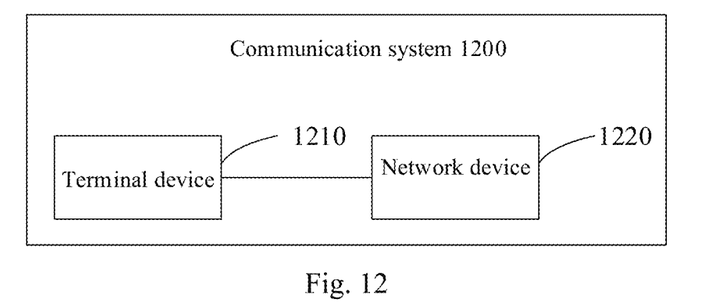
FIG. 12 is a schematic block diagram of a communication system provided by an embodiment of the present application.

FIG. 12 is a schematic block diagram of a communication system 1200 provided by an embodiment of the present application. As shown in FIG. 12, the communication system 1200 includes the terminal device 1210 and the network device 1220.

The terminal device 1210 may be used to implement the corresponding functions implemented by the terminal device in the method described above, and the network device 1220 may be used to implement the corresponding functions implemented by the network device in the method described above, which is not described here again for brevity.

The embodiments of the present application further provide a computer-readable storage medium used for storing a computer program.

Optionally, the computer-readable storage medium may be applied to the terminal device in the embodiments of the present application, and the computer program enables the computer to perform the corresponding process implemented by the terminal device in each method in the embodiments of the present application, which is not described here again for brevity.

Optionally, the computer-readable storage medium may be applied to the network device in the embodiments of the present application, and the computer program enables the computer to perform the corresponding process implemented by the network device in each method in the embodiments of the present application, which is not described here again for brevity.

The embodiments of the present application further provide a computer program product, including a computer program instruction.

Optionally, the computer program product may be applied to the terminal device in the embodiments of the present application, and the computer program instruction enables the computer to perform a corresponding process implemented by the terminal device in each method in the embodiments of the present application, and for brevity, details are not described here again.

Optionally, the computer program product may be applied to the network device in the embodiments of the present application, and the computer program instructions enables the computer to perform a corresponding process implemented by the network device in each method in the embodiments of the present application, and for brevity, details are not described here again.

The embodiments of the present application further provide a computer program.

Optionally, the computer program may be applied to the terminal device in the embodiments of the present application, and when the computer program runs on a computer, the computer is enabled to perform a corresponding process implemented by the terminal device in each method in the embodiments of the present application, and for brevity, details are not described here again.

Optionally, the computer program may be applied to the network device in the embodiments of the present application, and when the computer program runs on a computer, the computer is enabled to perform a corresponding process implemented by the network device in each method in the embodiments of the present application, and for brevity, details are not described here again.

Those of ordinary skill in the art may realize that the units and algorithm actions of each example described in combination with the embodiments disclosed in the present disclosure may be implemented by electronic hardware or a combination of computer software and the electronic hardware. Whether these functions are performed in a hardware or software manner depends on specific applications and design constraints of the technical solutions. Professionals may realize the described functions for each specific application by use of different methods, but such realization should not be considered outside the scope of the present application.

Those skilled in the art may clearly learn about that specific working process of the system, device and unit described above may refer to the corresponding processes in the method embodiment and will not be elaborated herein.

In several embodiments provided by the present application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected performed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the present application substantially or parts making contributions to the conventional art or part of the technical solutions may be embodied in form of software product, and the computer software product is stored in a storage medium, including a plurality of instructions configured to enable a piece of computer equipment (which may be a personal computer, a server, network device, etc.) to perform all or part of the actions of the method in each embodiment of the present application. The above-mentioned storage medium includes: various media capable of storing program codes such as a U disk, a mobile hard disk, a ROM, a RAM, a magnetic disk or an optical disk.

The above is only the specific implementation of the present application and not intended to limit the scope of protection of the present application. Any variations or replacements apparent to those skilled in the art within the technical scope disclosed by the present application shall fall within the scope of protection of the present application. Therefore, the scope of protection of the present application shall be subject to the scope of protection of the claims.

What is claimed is:

1. A communication method, comprising:
   receiving, by a terminal device, a first signal sent by a network device over an unlicensed spectrum, wherein the first signal is used for indicating that the network device obtains a channel resource of the unlicensed spectrum;
   determining, by the terminal device, a first time-domain resource position of a second signal based on the first signal, wherein the second signal is used for indicating information needed to be obtained by the network device for implementing communication with the terminal device by using the channel resource of the unlicensed spectrum, or the second signal is a downlink reference signal; and
   receiving, by the terminal device, the second signal sent by the network device over the unlicensed spectrum based on the first time-domain resource position,
   wherein the determining, by the terminal device, the first time-domain resource position of the second signal based on the first signal comprises:
   determining, by the terminal device, a time slot where the second signal is located based on a symbol position occupied by the first signal in a time slot where the first signal is located,
   wherein the determining, by the terminal device, the time slot where the second signal is located based on the symbol position occupied by the first signal in the time slot where the first signal is located comprises:
   determining, by the terminal device, a remaining symbol in the time slot where the first signal is located based on the symbol position; and
   determining, by the terminal device, the time slot where the second signal is located based on the remaining symbol.

2. The method according to claim 1, wherein the information needed to be obtained comprises at least one of a time slot structure, a channel usage duration, a channel usage bandwidth, and attribute information of the network device.

3. The method according to claim 1, wherein the determining, by the terminal device, the first time-domain resource position of the second signal based on the first signal comprises:
   determining, by the terminal device, the first time-domain resource position based on a second time-domain resource position occupied by the first signal.

4. The method according to claim 1, wherein the first time-domain resource position comprises a position of a time-domain resource set where the second signal is located.

5. The method according to claim 4, wherein the second signal is a Physical Downlink Control Channel (PDCCH), and the first time-domain resource position is a position of a PDCCH Control-Resource Set (CORESET).

6. The method according to claim 1, wherein the first time-domain resource position occupies a plurality of consecutive symbols in a time-domain.

7. A terminal device, comprising:
   a processor; and
   a memory,
   wherein the memory is used for storing a computer program, and the processor is used for calling the computer program from the memory and running the computer program stored in the memory, so as to:
   receive a first signal sent by a network device over an unlicensed spectrum, wherein the first signal is used for indicating that the network device obtains a channel resource of the unlicensed spectrum;
   determine a first time-domain resource position of a second signal based on the first signal, wherein the second signal is used for indicating information needed to be obtained by the network device for implementing communication with the terminal device by using the channel resource of the unlicensed spectrum, or the second signal is a downlink reference signal;
   receive the second signal sent by the network device over the unlicensed spectrum based on the determined first time-domain resource position,
   wherein the processing unit is specifically used for:
   determining a time slot where the second signal is located based on a symbol position occupied by the first signal in a time slot where the first signal is located,
   wherein the processing unit is specifically used for:
   determining a remaining symbol in the time slot where the first signal is located based on the symbol position; and
   determining the time slot where the second signal is located based on the remaining symbol.

8. The terminal device according to claim 7, wherein the first time-domain resource position comprises a time slot where the second signal is located and/or a symbol in the time slot.

9. The terminal device according to claim 8, wherein the time slot where the second signal is located is the first time slot and the first time slot is a time slot where the first signal is located.

10. The terminal device according to claim 9, wherein one of the following:
    the first time-domain resource position comprises a plurality of consecutive symbols and the plurality of consecutive symbols are a plurality of consecutive symbols in a preset position in the first time slot; and
    wherein the first time-domain resource position comprises a plurality of consecutive symbols, and the plurality of consecutive symbols are last multiple consecutive symbols in the first time slot.

11. The terminal device according to claim 8, wherein the time slot where the second signal is located is a second time slot and the second time slot differs from a time slot where the first signal is located by at least one time slot.

12. The terminal device according to claim 11, wherein the second time slot is located next to the time slot where the first signal is located.

13. The terminal device according to claim 11, wherein one of the following:
the first time-domain resource position comprises a plurality of consecutive symbols, and the plurality of consecutive symbols are a plurality of consecutive symbols in a preset position in the second time slot; and
wherein the first time-domain resource position comprises a plurality of consecutive symbols, and the plurality of consecutive symbols are first multiple consecutive symbols in the second time slot.

14. A network device, comprising:
a processor; and
a memory, wherein the memory is used for storing a computer program, and the processor is used for calling the computer program from the memory and running the computer program stored in the memory, so as to:
send a first signal to a terminal device over an unlicensed spectrum, wherein the first signal is used for indicating that the network device obtains a channel resource of the unlicensed spectrum;
determine a first time-domain resource position of a second signal based on a first signal, wherein the second signal is used for indicating information needed to be obtained by the network device for implementing communication with the terminal device by using the channel resource of the unlicensed spectrum, or the second signal is a downlink reference signal;
send the second signal to the terminal device over the unlicensed spectrum based on the first time-domain resource position,
wherein the processing unit is specifically used for:
determining a time slot where the second signal is located based on a symbol position occupied by the first signal in a time slot where the first signal is located,
wherein the processing unit is specifically used for:
determining a remaining symbol in the time slot where the first signal is located based on the symbol position; and
determining the time slot where the second signal is located based on the remaining symbol.

15. The network device according to claim 14, wherein the first time-domain resource position differs from a second time-domain resource position occupied by the first signal by a predetermined number of time slots and/or symbols.

16. The network device according to claim 14, wherein one of the following:
a starting time slot suitable for the information needed to be obtained is a time slot of the second signal; and
the starting time slot suitable for the information needed to be obtained is a next time slot of the time slot of the second signal.

* * * * *